United States Patent
Acharya et al.

(10) Patent No.: US 8,910,197 B2
(45) Date of Patent: Dec. 9, 2014

(54) UPDATE PROCESS FOR INTERFACE DEVICE BASED TARGETED INFORMATION INSERTION

(75) Inventors: Swarup Acharya, New Providence, NJ (US); Yee Him Cheung, New York, NY (US); Anurag Srivastava, New Providence, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1729 days.

(21) Appl. No.: 12/197,505

(22) Filed: Aug. 25, 2008

(65) Prior Publication Data

US 2010/0050227 A1 Feb. 25, 2010

(51) Int. Cl.

| | |
|---|---|
| H04N 7/10 | (2006.01) |
| H04N 7/025 | (2006.01) |
| H04N 21/845 | (2011.01) |
| H04N 21/6408 | (2011.01) |
| H04N 21/262 | (2011.01) |
| H04L 12/18 | (2006.01) |
| H04L 29/06 | (2006.01) |
| H04N 21/2668 | (2011.01) |
| H04N 21/658 | (2011.01) |
| H04N 21/6405 | (2011.01) |
| H04N 21/81 | (2011.01) |

(52) U.S. Cl.
CPC ........ *H04L 12/1868* (2013.01); *H04N 21/8456* (2013.01); *H04N 21/6408* (2013.01); *H04N 21/26291* (2013.01); *H04L 65/4076* (2013.01); *H04N 21/2668* (2013.01); *H04N 21/6581* (2013.01); *H04N 21/6405* (2013.01); *H04N 21/812* (2013.01)
USPC ............... 725/32; 725/34; 725/35; 725/36

(58) Field of Classification Search
None
See application file for complete search history.

(56) References Cited

U.S. PATENT DOCUMENTS

| | | | | |
|---|---|---|---|---|
| 5,978,381 | A * | 11/1999 | Perlman et al. | 370/432 |
| 6,973,667 | B2 * | 12/2005 | Fritsch | 725/88 |
| 7,203,758 | B2 | 4/2007 | Cook et al. | |
| 7,328,231 | B2 * | 2/2008 | LaCroix et al. | 709/200 |

(Continued)

FOREIGN PATENT DOCUMENTS

WO WO0247384 6/2002

OTHER PUBLICATIONS

U.S. Appl. No. 11/764,472 filed in the name of S. Acharya et al. on Jun. 18, 2007 and entitled "Targeted Advertisement Insertion with Interface Device Assisted Switching.".

*Primary Examiner* — Nasser Goodarzi
*Assistant Examiner* — Fred Peng
(74) *Attorney, Agent, or Firm* — Ryan, Mason & Lewis, LLP

(57) ABSTRACT

Advertisements or other types of targeted information are delivered to set-top boxes or other user interface devices of a signal distribution system. In one aspect of the invention, at least one multicast update comprising updated targeted information is sent to the user interface devices during a multicast update period. If a given one of the user interface devices is unable to obtain a complete set of the updated targeted information from the multicast update before timeout of the multicast update period, a unicast update comprising at least a portion of the updated targeted information is sent to the given user interface device during a unicast update period. The unicast update may be sent responsive to a request from the given user interface device for a designated portion of the updated targeted information.

20 Claims, 5 Drawing Sheets

(56) References Cited

U.S. PATENT DOCUMENTS

| | | | |
|---|---|---|---|
| 7,500,258 B1* | 3/2009 | Eldering | 725/32 |
| 7,640,571 B1* | 12/2009 | Reichgott et al. | 725/142 |
| 7,757,251 B2* | 7/2010 | Gonder et al. | 725/39 |
| 2002/0061029 A1* | 5/2002 | Dillon | 370/432 |
| 2003/0126162 A1* | 7/2003 | Yohe et al. | 707/201 |
| 2004/0210944 A1 | 10/2004 | Brassil et al. | |
| 2005/0210530 A1* | 9/2005 | Horvitz et al. | 725/134 |
| 2006/0239195 A1 | 10/2006 | Camins et al. | |
| 2006/0259927 A1 | 11/2006 | Acharya et al. | |
| 2006/0277576 A1 | 12/2006 | Acharya et al. | |
| 2007/0107011 A1 | 5/2007 | Li et al. | |
| 2007/0118617 A1 | 5/2007 | Lee et al. | |
| 2007/0237330 A1 | 10/2007 | Srivastava | |
| 2007/0240192 A1 | 10/2007 | Acharya et al. | |
| 2007/0300252 A1 | 12/2007 | Acharya et al. | |
| 2008/0005770 A1 | 1/2008 | Acharya et al. | |
| 2008/0060002 A1* | 3/2008 | Noll et al. | 725/35 |
| 2008/0060030 A1* | 3/2008 | Chang et al. | 725/92 |
| 2008/0310408 A1* | 12/2008 | Thompson et al. | 370/386 |
| 2009/0055880 A1* | 2/2009 | Batteram et al. | 725/100 |
| 2009/0094639 A1* | 4/2009 | Haberman et al. | 725/34 |
| 2009/0150926 A1* | 6/2009 | Schlack | 725/34 |
| 2009/0150929 A1* | 6/2009 | Park et al. | 725/34 |
| 2009/0235307 A1* | 9/2009 | White et al. | 725/34 |
| 2009/0288113 A1* | 11/2009 | Skinner | 725/32 |
| 2009/0320133 A1* | 12/2009 | Viljoen et al. | 726/24 |
| 2010/0250678 A1* | 9/2010 | Hu et al. | 709/204 |
| 2010/0306792 A1* | 12/2010 | Li et al. | 725/23 |

* cited by examiner

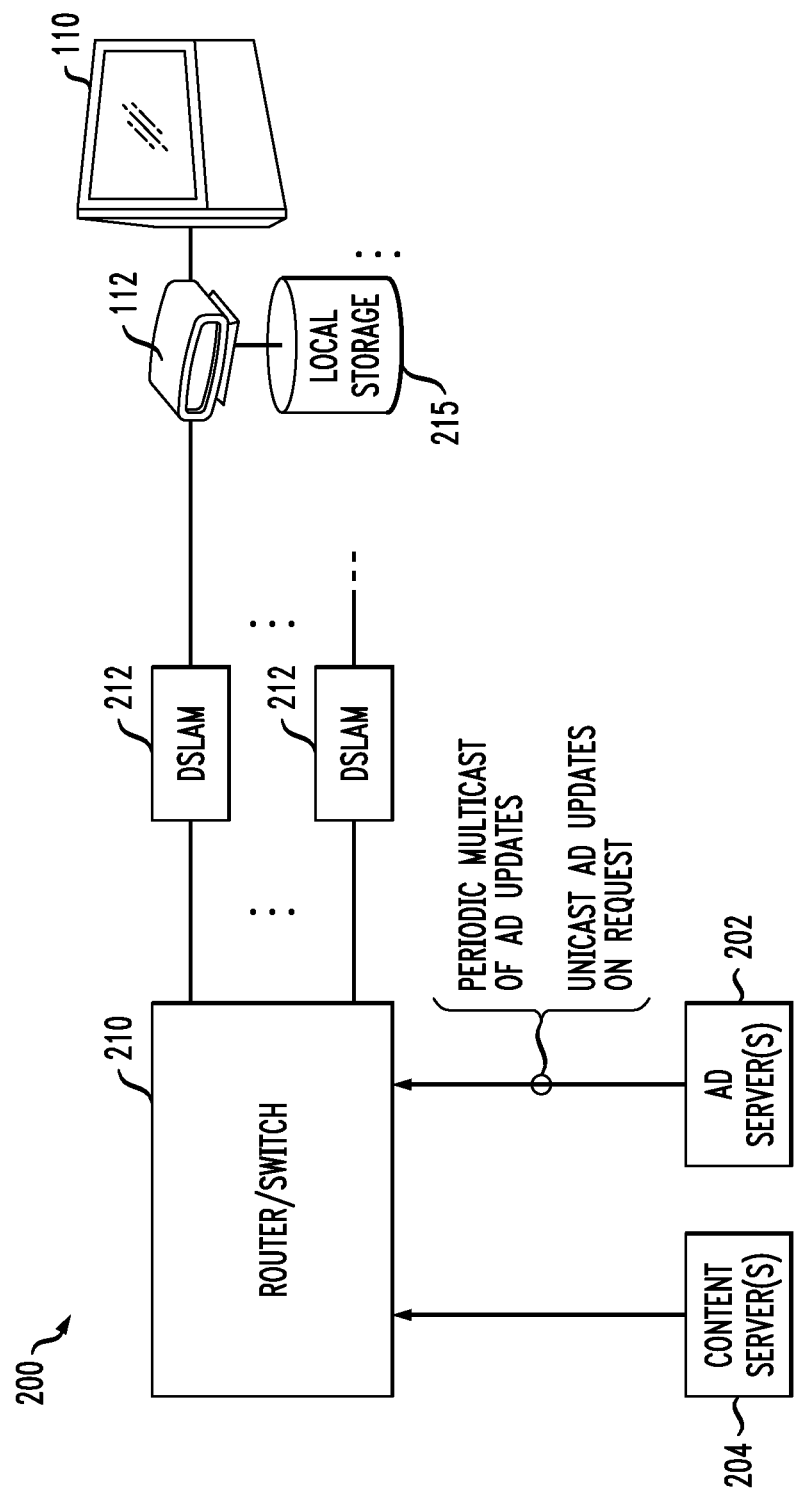

UPDATE PROCESS FOR INTERFACE DEVICE BASED TARGETED INFORMATION INSERTION

FIELD OF THE INVENTION

The present invention relates generally to signal distribution systems, and more particularly to techniques for providing targeted advertisements or other types of targeted information to user interface devices within such systems.

BACKGROUND OF THE INVENTION

Conventional signal distribution systems include, by way of example, cable television systems, satellite television systems, and systems providing Internet protocol television (IPTV) over digital subscriber line (DSL) or fiber. Such systems are configured to distribute media streams associated with subscription television services to system subscribers or other users. Typically, a given subscriber is provided with an interface device, such as a set-top box or receiver, for communicating with system head end equipment. The interface device is configured to permit the subscriber to receive, on a television or other presentation device coupled to the interface device at a given location, the particular subscription television services to which that subscriber is entitled by virtue of the subscription. A given subscription may encompass, by way of example, a number of basic broadcast channels, as well as one or more premium programming channels, such as movie channels, sports channels, specialty channels, pay-per-view channels, on-demand video channels, etc.

A number of techniques are known for providing targeted advertisements in a signal distribution system of the type described above. One example is described in PCT International Publication No. WO 02/47384, entitled "Method and Apparatus for IP Multicast Content Distribution System Having National and Regional Demographically Targeted Advertisement Insertion." In this technique, demographic targeting of inserted advertisement content is accomplished on a per-stream basis at a regional network level by modifying header information during a packet replication process.

A problem with these and other known techniques is that the advertisement insertion process is typically carried out entirely in head end equipment of the system, so as to be fully transparent to the interface device. Thus, the interface device at the user location is not even aware that the targeted insertion is taking place, and cannot distinguish between a stream having inserted targeted advertisements and an ordinary stream. This type of arrangement unduly limits the flexibility of the system, and may prevent it from achieving a desired level of granularity in its targeting of advertisements to particular groups of users. It also makes it difficult to adapt the insertion process to situations such as a user changing a channel while a targeted advertisement is being played.

These and other problems are addressed by techniques disclosed in U.S. patent application Ser. No. 11/764,472, filed Jun. 18, 2007 and entitled "Targeted Advertisement Insertion with Interface Device Assisted Switching," which is commonly assigned herewith and incorporated by reference herein. These techniques directly involve a set-top box or other interface device in the insertion process. In one arrangement, the signal distribution system is configured to include a detection server and an advertisement server. The detection server detects at least one cue associated with a first media stream, and generates timing information from the detected cue. The timing information is signaled to the interface device. The advertisement server generates a second media stream containing targeted information for delivery to the interface device. The interface device switches from the first stream to the second stream based on the timing information. The timing information may also be signaled by the detection server to the advertisement server, for use in controlling generation of the second stream.

Despite the important advantages provided by the techniques disclosed in the above-noted application, a need remains for further improvements in targeted advertisement insertion techniques that involve a set-top box or other interface device in the insertion process.

SUMMARY OF THE INVENTION

The present invention in the illustrative embodiments provides improved processes for delivery of updated targeted advertisements or other targeted information, via a combination of multicast and unicast delivery techniques, for local storage by a set-top box or other interface device.

In accordance with one aspect of the invention, advertisements or other types of targeted information are delivered to user interface devices of a signal distribution system. At least one multicast update comprising updated targeted information is sent to the user interface devices during a multicast update period. If a given one of the user interface devices is unable to obtain a complete set of the updated targeted information from the multicast update before timeout of the multicast update period, a unicast update comprising at least a portion of the updated targeted information is sent to the given user interface device during a unicast update period. The unicast update may be sent responsive to a request from the given user interface device for a designated portion of the updated targeted information.

The multicast update may be sent in a plurality of rounds with each round including the same set of updated targeted information. For example, each of the rounds may comprise a particular sequence of updated targeted advertisements. The portion of the updated targeted information sent to the given user interface device in the unicast update may comprise particular ones of the updated targeted advertisements that the given user interface device is unable to download from the multicast update.

The user interface devices may be configured to download the updated targeted information from the multicast update only when the devices are in a specified mode of operation, such as a non-viewing mode of operation. A given one of the user interface devices may be in such a mode, for example, when its associated television or other presentation device is turned off.

The illustrative embodiments advantageously facilitate the provision of targeted advertisements and other targeted information in a wide variety of signal distribution systems. Through the use of a combination of multicast and unicast techniques, the bandwidth required to deliver updated targeted information to user interface devices is substantially reduced.

BRIEF DESCRIPTION OF THE DRAWINGS

FIG. 2 is a more detailed view of a portion of a signal distribution system in an illustrative embodiment.

DETAILED DESCRIPTION OF THE INVENTION

The invention will be illustrated herein in conjunction with illustrative embodiments of signal distribution systems and associated targeted advertisement insertion techniques. It should be understood, however, that the invention is not limited to use with the particular systems and techniques described, but is instead more generally applicable to any signal distribution application in which it is desirable to provide enhanced flexibility and effectiveness in delivery of targeted advertisements. For example, although described herein primarily in the context of television services, the techniques of the invention can also be adapted in a straightforward manner to audio services, such as subscription audio services delivered via digital satellite radio systems. Systems of the latter type are considered a type of signal distribution system as that term is used herein.

In one embodiment, a signal distribution system is configured to include targeted advertisement insertion functionality. This embodiment utilizes a set-top box (STB) or other user interface device of the system to control the targeted advertisement insertion process, and involves directly pushing targeted advertisements to the interface device to be stored locally prior to insertion. Such an embodiment is also referred to herein as implementing an STB prefetch approach to targeted advertisement insertion.

Figure 1A:
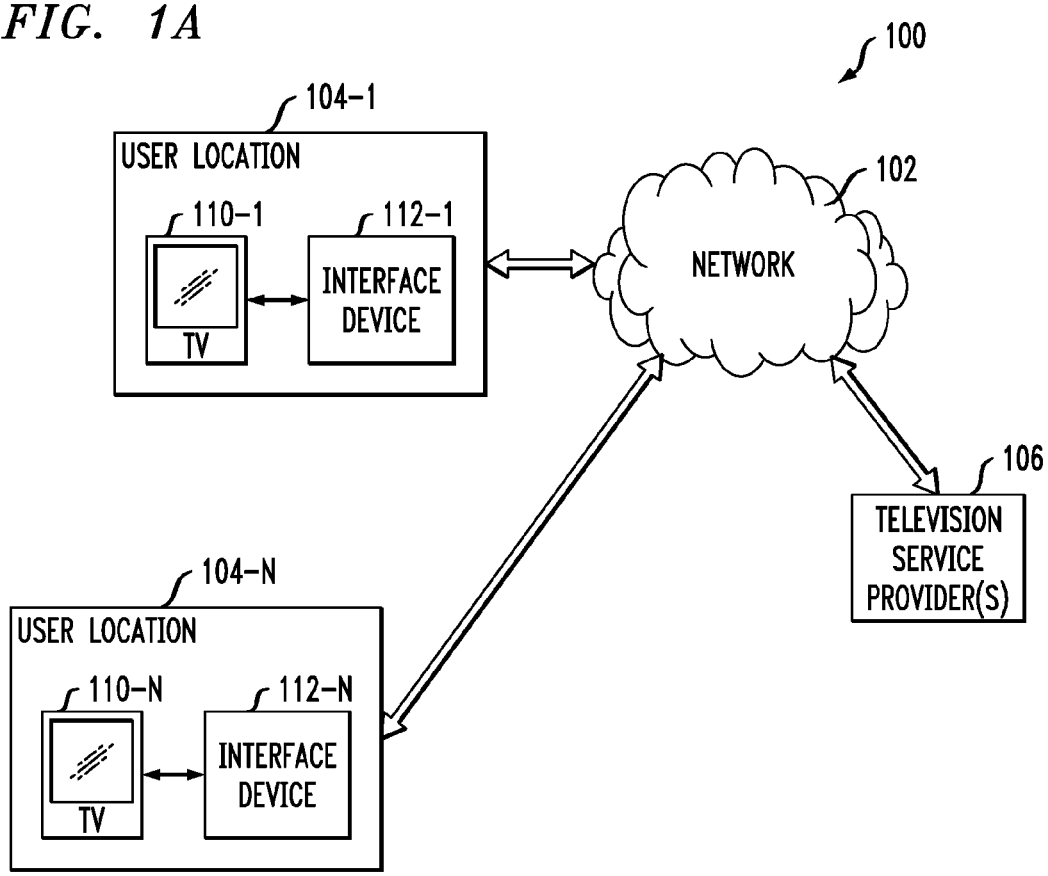
FIG. 1A shows an illustrative embodiment of a signal distribution system in accordance with the invention.

Referring now to FIG. 1A, a signal distribution system 100 comprises a network 102 over which equipment at user locations 104-1 through 104-N communicates with one or more television service providers 106. The signal distribution system 100 may comprise, by way of example, a cable television system, a satellite television system, an IPTV system, or portions or combinations of these and other systems. Element 106 may comprise otherwise conventional service provider equipment, including, for example, head end systems, satellites, servers, etc. The equipment at a given location 104-$i$, $i=1, \ldots N$, comprises a television 110-$i$ coupled to an interface device 112-$i$. The interface devices 112 for purposes of the illustrative embodiments will be assumed to be STBs, but in other embodiments may comprise, for example, receivers, computers, or other processor-based devices, in any combination. Such devices are also referred to herein as user interface devices. A given device of this type allows one or more users to access media streams that are delivered to the device via other elements of the signal distribution system.

The network 102 may comprise any type of communication network suitable for transporting signals associated with the provision of television services, and the invention is not limited in this regard. For example, portions of the network 102 may comprise local networks, wide area networks, the Internet, etc.

A given one of the locations 104 may comprise, for example, a designated home location of a particular system subscriber. Thus, it is a location at which the subscriber is permitted to access one or more television services by virtue of his or her subscription. It should be noted that the term "subscriber" as used herein is intended to encompass other subscribing entities, such as businesses or organizations, in addition to individuals or families. Subscribers may be viewed as examples of what are more generally referred to herein as users, and the term "user" is thus intended to include subscribers as well as other types of users. Also, the term "home" should be construed broadly, and is not intended to be restricted to individual or family residences. Instead, the home location of a particular subscriber may be any location at which that subscriber ordinarily accesses television services in accordance with the subscription. A home location may therefore be at a business facility, hotel or other building, in a means of conveyance such as an automobile, train, bus or airplane, or at any other suitable location.

The techniques of the present invention may be utilized in conjunction with the provision of subscription television services to roaming users. In such an arrangement, one of the locations 104 may be a home location of a given subscriber and another of the locations may be a remote location of that subscriber. Additional details regarding roaming subscription television services may be found in, for example, U.S. patent application Ser. No. 11/130,329, filed May 16, 2005 and entitled "Method and Apparatus for Providing Remote Access to Subscription Television Services," U.S. patent application Ser. No. 11/399,726, filed Apr. 7, 2006 and entitled "Method And Apparatus for Delivering Subscription Service Content to Roaming Users," U.S. patent application Ser. No. 11/399,872, filed Apr. 7, 2006 and entitled "Delivery of Subscription Services to Roaming Users Through Head End Equipment," and U.S. patent application Ser. No. 11/425,566, filed Jun. 21, 2006 and entitled "User Interface Methods and Apparatus for Roaming Access to Subscription Services," all commonly assigned herewith and incorporated by reference herein.

Other aspects of exemplary signal distribution systems in which the techniques of the present invention may be implemented are described in U.S. patent application Ser. No. 11/145,832, filed Jun. 6, 2005 and entitled "Signal Distribution System with User-Defined Channel Comprising Information from an External Network," and U.S. patent application Ser. No. 11/427,879, filed Jun. 30, 2006 and entitled "Signal Distribution System with Interrupt Processing and Trick Play Functionality," both commonly assigned herewith and incorporated by reference herein.

It is to be appreciated that the invention does not require any particular geographic relationship between the various user locations 104. Accordingly, the locations may all be within the same local area, served by a common service provider. As another example, two or more of the locations may be more geographically remote from one another, such as in different regions of the same country, or even in different countries, with the two locations being serviced by different television service providers. It is also possible that two or more of the locations may be in a common building or other structure, for example, in respective first and second apartments of an apartment building. Numerous alternative arrangements are possible, as will be apparent to those skilled in the art.

Figure 1B:
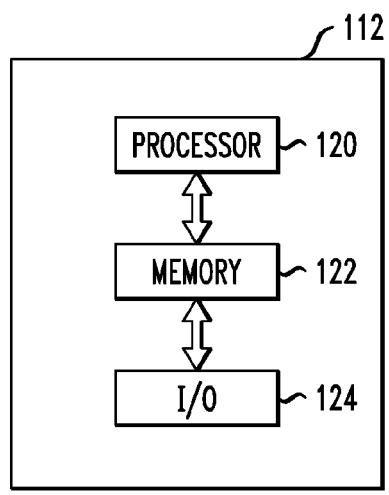
FIG. 1B shows a simplified block diagram of an interface device of the FIG. 1A system.

FIG. 1B illustrates that a given one of the interface devices 112 comprises a processor 120, a memory 122, and input/output (I/O) elements 124. The processor 120 may be, e.g., a microprocessor, a microcontroller, an application-specific integrated circuit (ASIC) or other type of processing device, as well as portions or combinations of such devices. The memory 122 may include an electronic random access memory (RAM), a read-only memory (ROM) or other type of storage device, as well as portions or combinations of such devices. The processor 120 and memory 122 are used in storage and execution of one or more software programs for assisting in targeted advertisement insertion, as will be described in greater detail below. For example, an ad insertion software agent, intelligent application or other type of software program may be downloaded to or otherwise stored in the interface device for use in performing the interface device portion of an ad insertion process. Examples of such arrangements will be described below in conjunction with FIGS. 2 through 4.

Memory 122 may be viewed as an example of what is also referred to herein as a computer-readable storage medium.

The particular signal distribution system configuration described above should be viewed as an illustrative example of such a system, and it is to be understood that the invention can be implemented using other types and configurations of system components.

The present invention in an illustrative embodiment deals with delivery of targeted advertisements to users via an IPTV system. It is to be appreciated that the described techniques can be extended in a straightforward manner to be implemented using other types of systems, such as cable or satellite television systems.

A targeted advertisement insertion technique in this embodiment involves providing targeted advertisements to the STBs of the system using a combination of multicast and unicast updates. More particularly, targeted advertisements are delivered to a designated group of STBs by sending updated targeted advertisements to the STBs during a multicast update period. If a given one of the STBs is unable to obtain the updated targeted advertisements before timeout of the multicast update period, a unicast update comprising at least a portion of the updated targeted advertisements is sent to that STB during a unicast update period.

The above-noted targeted advertisement insertion technique will now be described in greater detail with reference to FIGS. 2, 3 and 4. Again, it will be assumed for description of these illustrative embodiments that the interface device 112 is an STB, although other types of interface devices could be used.

FIG. 2 shows a more detailed view of one possible implementation of a portion of the system 100. In this embodiment, the network 102 comprises an IP network over which multiple streams are delivered to STB 112 via IPTV head end equipment associated with a television service provider 106. The advertisement insertion process in this embodiment and others described herein may be implemented at least in part in the form of software that is executed by system elements such as one or more interface devices and equipment of one or more television service providers. Again, although illustrated in the context of IPTV, the described services can be adapted in a straightforward manner for use in other types of signal distribution systems, such as cable and satellite television systems.

In the FIG. 2 arrangement, the system 100 comprises one or more advertisement servers 202 and one or more content servers 204. These elements in the present embodiment are assumed to be associated with television service provider 106, but could alternatively be associated with other system elements. The servers may each comprise separate stand-alone servers, or two or more of them may be implemented on a common processing platform. For example, these servers may be implemented as servlets of a larger ad insertion system server. The servers 202 and 204 are coupled to a network element 210 which in this embodiment illustratively comprises a router or switch of the IP network. For example, the network element 210 may comprise a Gigabit Ethernet switch or other video switch suitable for processing streams for transmission to the STB 112. Network element 210 is coupled via DSL access multiplexers (DSLAMs) 212 to the STB 112 and other STBs which are not explicitly shown in this figure.

In an alternative embodiment, the servers 202 and 204 may instead be implemented in whole or in part internally to the network element 210, utilizing one or more line cards or other processing devices of that network element.

The STB 112 in the FIG. 2 embodiment has an associated local storage element 215 suitable for storing targeted advertisements that are supplied from the advertisement server 202 via network element 210 and DSLAM 212. The local storage element 215 may comprise, for example, a disk-based storage element of a digital video recorder (DVR) coupled to or otherwise associated with the STB 112. This local storage element, although illustratively shown as being external to the STB 112, may instead be implemented at least in part internal to the STB. For example, the local storage element 215 may be implemented in whole or in part using memory 122 of FIG. 1B. Element 215 is thus considered an example of what is more generally referred to herein as "memory."

The STB 112 is configured to process an original content stream received from the content server 204 to detect ad markers or other ad cues in that stream. Such a detection mechanism may be implemented as a software agent running on the STB that continuously processes the content stream to monitor for the presence of ad markers or other ad cues. The ad cues may comprise, by way of example, conventional SCTE-35 signaling messages inserted into packets of an MPEG stream. In one embodiment, the STB parses program association table (PAT) and program map table (PMT) information in an MPEG header to obtain the program identifier (PID) of an elementary stream (ES) carrying the ad cues, and monitors the ES to locate packets containing the ad cues. When these packets are found, usually about 8-10 seconds before the corresponding ad slot, they are processed to obtain the precise timing information as described by a corresponding presentation time stamp (PTS). This timing information is utilized by the STB to control playback in the detected ad slots of targeted advertisements retrieved from the local storage element 215.

Thus, the STB switches from an original content stream to an ad stream at an appropriate time as determined based on the timing information. The timing information is also utilized to allow the STB to return from the ad stream to the original content stream at the appropriate time. For example, the timing information may include a specified duration of the targeted ad. The STB can thus start a timer when it switches to the ad stream, and switch back to the original stream when the timer expires. The stream switching in the STB 112 may also or alternatively make use of conventional signaling protocols, such as Internet group management protocol (IGMP).

It should be noted that local detection of ad cues at the STB 112 can lead to some missed insertion opportunities, for example, when a user switches to a new channel which is already in the middle of an ad slot. The techniques disclosed in the above-cited U.S. patent application Ser. No. 11/764,472 address this issue.

A mapping of targeted ad streams to particular demographic groups may be stored in a table in a non-volatile memory of the STB. The STB itself may also or alternatively be assigned to one or more demographic groups. For example, the STB may belong to several demographic groups simultaneously or may be assigned unique demographic groups for respective times of the day in order to capture the fact that different family members may be viewing television at different times.

In order to ensure proper return from a given targeted ad stream, the ad insertion software agent in the STB monitors the selected channel and signals the STB to switch back to the original content stream at the end of the current ad slot time. However, if the user switches to another channel during the current ad slot, return to the original stream is canceled. Calculation of the ad slot time may be done, for example, by running a timer for the duration of the ad slot as determined by local detection as previously described.

As indicated previously, the targeted advertisements played by the STB 112 in the detected ad slots are prefetched advertisements that are stored in the local storage element 215. Such advertisements must be periodically updated by the system. The manner in which such updates occur will now be described with reference to the flow diagram of FIG. 3 and an exemplary update sequence shown in FIG. 4. In the embodiments to be described, the STB downloads updated targeted advertisements from a combination of multicast and unicast updates when the STB is in a non-viewing mode of operation, for example, when its associated television 110 or other presentation device is turned off.

Figure 3:
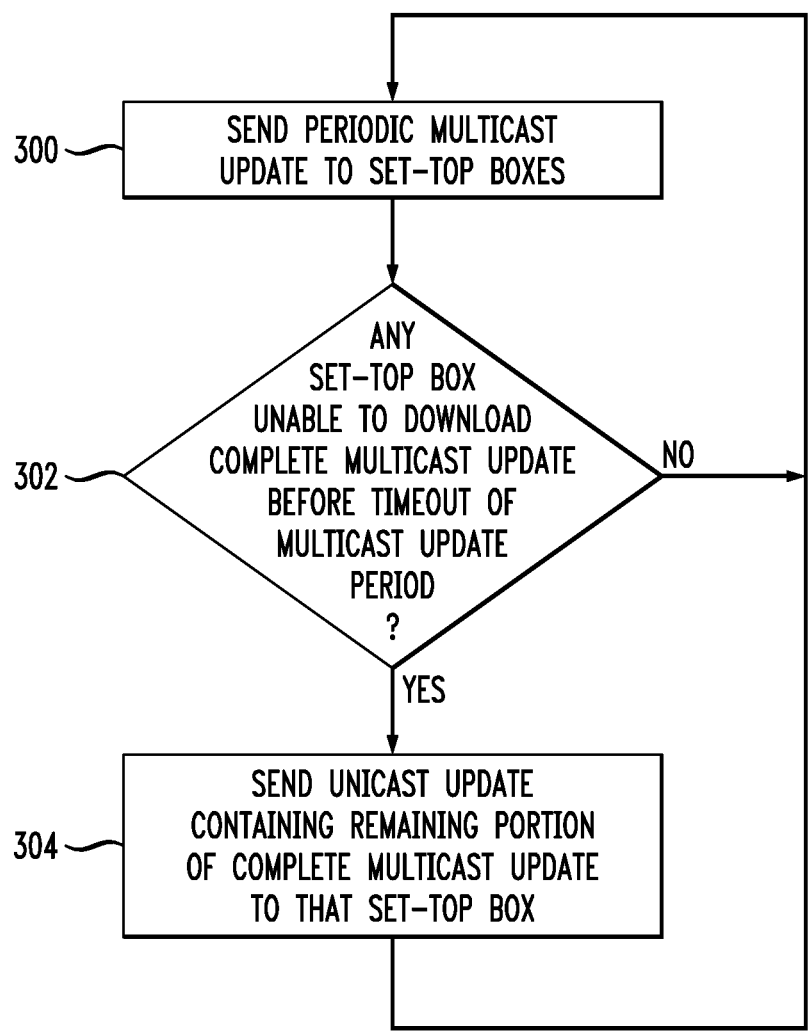
FIG. 3 is a flow diagram of a process for updating targeted information stored locally by the interface devices of the FIG. 2 system.

FIG. 3 shows steps 300 through 304 of an exemplary targeted advertisement update process. These steps are assumed to be implemented in television service provider head end equipment, such as the advertisement server 202 of FIG. 2, but could be implemented in one or more other system elements.

In step 300, periodic multicast updates are sent to the STBs 112 of system 100. These updates are sent during designated multicast update periods. As mentioned previously, the STBs of the system 100 may be organized into various groups, with different groups of STBs receiving different sets of targeted advertisements based on location, demographics or other factors. It is assumed that the multicast update referred to in step 300 is directed to a particular such group of STBs. Of course, other multicast updates may also be sent to other groups of STBs within the system.

The STBs 112 in the present embodiment download targeted advertisements from the multicast update only when in a specified mode of operation, namely, only when the STBs are in respective non-viewing modes of operation. This ensures that the periodic downloading of updated targeted advertisements does not unduly interfere with user viewing of content streams on the televisions 110. As indicated above, a given STB may be determined to be in its non-viewing mode of operation when its associated television 110 or other presentation device is turned off. Alternatively, the non-viewing mode of operation may be a mode in which functions of the STB relating to delivery of content streams to the television 110 are paused, turned off or otherwise interrupted.

Because different STBs will be in their respective non-viewing modes of operation at different times, based on the viewing habits of the corresponding users, not every STB may be able to download the full set of updated targeted advertisements from the periodic multicast update before timeout of the multicast update period. For example, a given STB may remain in a viewing mode of operation for all or most of the multicast update period, such that there is insufficient time for that STB to complete the download before timeout of the multicast update period.

In step 302, a determination is made as to whether any STB in the group of STBs to which the multicast update is directed is unable to download the complete update before timeout of the multicast update period.

If there is no such STB, all of the STBs in the group were able to download the full set of updated targeted advertisements from the multicast update, and the process returns to step 300 to await the next periodic multicast update.

If at least a given one of the STBs is unable to download the complete update before timeout of the multicast update period, a unicast update is sent to the given STB in step 304, containing at least the portion of the update that the given STB was unable to download from the multicast update of step 300. Each such STB identified in step 302 as being unable to download the complete update receives a unicast update containing at least the portion of the update that it was unable to download.

The determination made in step 302 may be based, for example, on requests received from those STBs that were unable to download the complete update during the multicast update period. For example, the advertising server 202 of FIG. 2 may receive a request from a given one of the STBs for a designated portion of the updated targeted advertisements that were previously sent in the periodic multicast update. The unicast update containing at least the designated portions is sent to the given STB responsive to the request. It is also possible that the given STB could just indicate that its update is incomplete and the advertising server could unicast the entire update to that STB, although such an approach would consume unnecessary bandwidth for those portions of the update that were downloaded by the STB during the multicast update period.

Although the foregoing description of the FIG. 3 process refers to updating of targeted advertisements, a similar approach may of course be used to provide an initial set of targeted advertisements to a group of STBs. The term "update" as used herein should therefore be construed broadly, so as to generally encompass any of a number of arrangements for ensuring that the appropriate targeted information is present in a given STB.

Also, although the FIG. 3 process is described with reference to targeted advertisements, it is contemplated that the process could be applied to other types of targeted information, such as, for example, custom program guides, on-demand video screens, etc.

Figure 4:
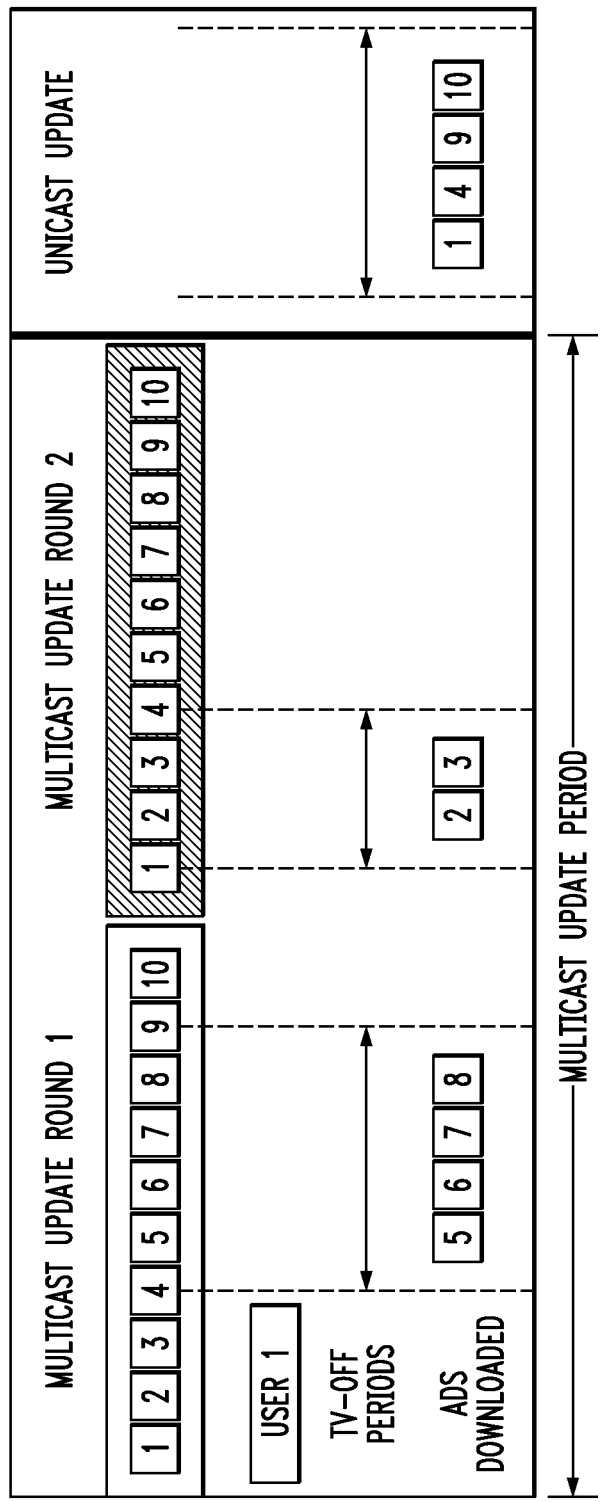
FIG. 4 is a diagram illustrating one example of the update process of FIG. 3.

FIG. 4 shows a more particular example of the targeted advertisement update process described in conjunction with FIG. 3. In the FIG. 4 diagram, a multicast update period includes two consecutive rounds, denoted Round 1 and Round 2, with each round including the same set of updates. More specifically, each of Round 1 and Round 2 comprises the same set of ten advertisements, denoted 1 through 10, to be downloaded to each of a plurality of STBs in a given group of STBs. Thus, each of the rounds comprises a particular sequence of updated targeted advertisements.

As indicated previously, different STBs in the group will generally download the targeted advertisements from the multicast updates at different times, because their associated users will have different viewing habits. In this example, a given STB can download from the multicast update only when its corresponding television is off. The STB may independently detect or infer this condition by determining that the STB itself is in a non-viewing mode of operation, for example, one in which the STB is not supplying video or another type of content stream to the television. Thus, the STB can determine for itself when it is appropriate to begin downloading targeted advertisements from the multicast updates.

The FIG. 4 diagram shows what are referred to as TV-off periods for a particular STB corresponding to User 1. These TV-off periods should not be construed as requiring that the television actually be powered down, but as mentioned above could instead be independently determined by the STB as periods in which the STB is in a non-viewing mode of operation. The STB associated with User 1 is able to download targeted advertisements from the multicast update rounds only during the TV-off periods of that user. Thus, as shown in the figure, the User 1 STB is able to download targeted ads 5, 6, 7 and 8 in the first multicast update round, and targeted ads 2 and 3 in the second multicast update round. Accordingly, upon timeout of the multicast update period, the User 1 STB has been unable to download the complete multicast update comprising targeted ads 1 through 10. The User 1 STB is therefore missing ads 1, 4, 9 and 10.

The User 1 STB indicates this condition to the advertisement server 202 or other system element by sending a request. This request may, for example, indicate the particular ones of the updated targeted ads that the User 1 STB was unable to download from the periodic multicast updates. In the example as shown, the request indicates that the User 1 STB was unable to download ads 1, 4, 9 and 10.

The system responds to the request by sending a unicast update to the User 1 STB in a unicast update period that immediately follows the timeout of the multicast update period. This unicast update, directed specifically to the User 1 STB, contains not the complete update, but only the missing ads 1, 4, 9 and 10 identified by the User 1 STB in its request. Again, other embodiments could dispense with the need for the STB to identify the particular ads that it was unable to download, and the system could instead unicast the entire update comprising ads 1 through 10.

In the FIG. 4 example, the unicast update period does not overlap with the multicast update period. Thus, the multicast updates are sent during designated periods of time and the unicast updates are sent outside of those designated periods of time. Although not indicated in the figure, the unicast update period will generally be followed by another multicast update period. In other embodiments, the multicast update period could include more or fewer than the two rounds shown in the present example.

The illustrative embodiments described in conjunction with FIGS. 2 through 4 utilize a combined multicast and unicast approach to updating targeted advertisements in the system 100. The multicast updates are bandwidth efficient and are intended to supply the majority of the updated advertisements to each STB, while the unicast updates serve an auxiliary role and are triggered by timeout of the multicast updates.

The multicast and unicast updates may occur over designated channels in the system. For example, to download targeted ads from a given multicast update, the STB could switch to a multicast update channel whenever it determines or infers that the television is off, that is, when the STB enters a non-viewing mode of operation. If upon switching to such a channel the STB determines that the multicast update period has timed out, it can send a request for a unicast update as described above.

Figure 5:
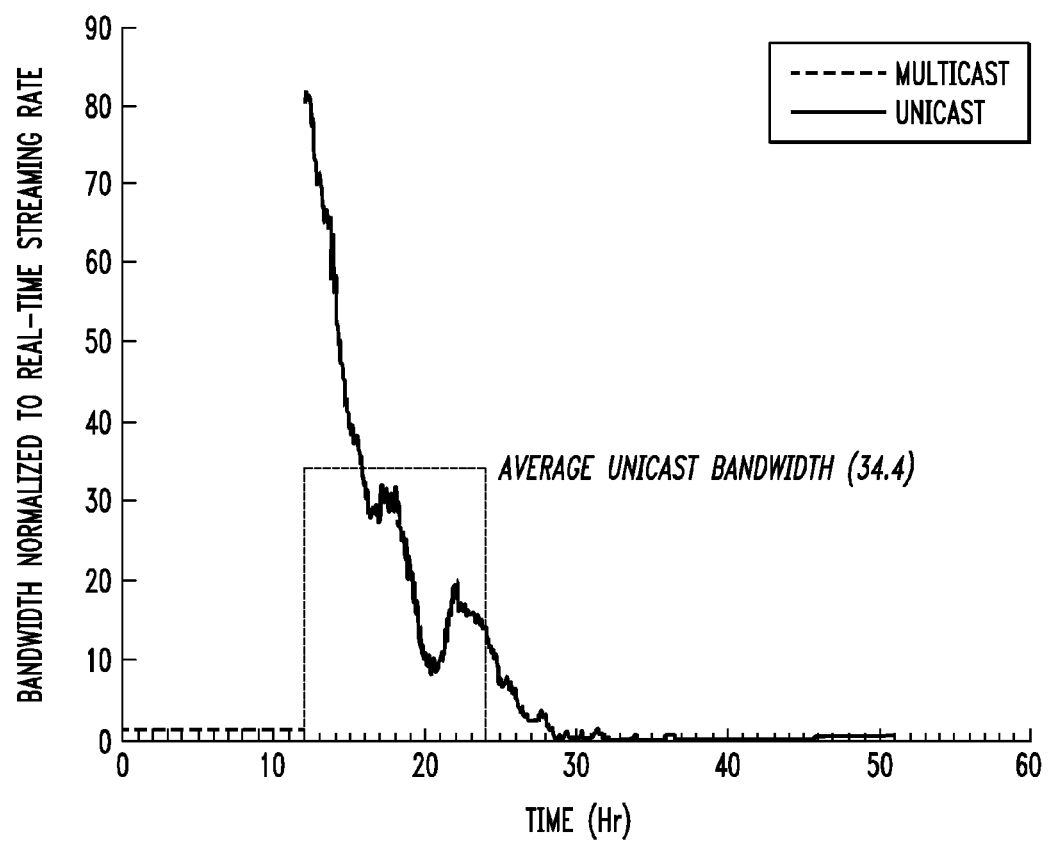
FIG. 5 is a plot of simulation results showing multicast and unicast bandwidth requirements associated with the updating of targeted information in an illustrative embodiment of the invention.

FIG. 5 shows a plot of multicast and unicast bandwidth requirements associated with the updating of targeted advertisement information, based on simulation of an illustrative embodiment of the invention. In this embodiment, it was assumed that the system was configured to provide 32 content channels, with a total of 2132 ad slots, and that the multicast update period was 12 hours. Six basic TV viewing patterns were defined, with a percentage of the total number of users being assigned to each pattern, as follows:

1. Working adults (10%): 7-8 am, 7-10 pm
2. Seniors (10%): 10 am-1 pm, 5-9 pm
3. Household without kids (30%): 7-8 am, 10 am-12 noon, 8-11 pm
4. Household with kids (30%): 7-8 am, 10 am-12 noon, 4-6 pm, 8-10 pm
5. Light viewer (10%): 3 hrs per day
6. Heavy viewer (10%): 8.5 hrs per day.

The simulation is based on 1000 users, with 500 30-second ads per update, and a normalized unicast speed of 0.5. Infinite local targeted ad storage resources are assumed for each user.

The plot in the figure shows the bandwidth normalized to the real-time streaming rate of the system, as a function of time in hours.

It can be seen that for the first 12 hours, the system is in the multicast update mode and the normalized bandwidth is constant at a relatively low level. At the timeout of the multicast update period, the normalized bandwidth increases sharply, and then generally decreases over the unicast update period. The average normalized unicast bandwidth for a 12-hour unicast update period is 34.4.

Although not shown in the figure, another multicast update period would typically begin after completion of a designated unicast update period. For example, another 12-hour multicast update period may begin after a 12-hour unicast update period.

It can be seen that in the FIG. 5 example, the bandwidth associated with the unicast update is non-zero even after the end of the 12-hour unicast update period. This suggests that not every user was able to obtain the full set of updated advertisements. Any such users could be configured, for example, to revert to specified default advertisements, or to increase the frequency of other advertisements that were received.

The particular parameters used in the above-described simulation are presented by way of illustrative example only, and should not be construed as limitations or requirements of the invention.

Other embodiments could alter the multicast and unicast update periods in a manner that ensures that all or most users receive the appropriate updates. For example, the multicast update periods may be set differently for different groups of STBs based on the demographics of their associated users. Thus, different multicast and unicast update sequences may be used for different groups of users, with the users being segmented into such groups based on demographics.

It is also to be appreciated that the FIG. 3 targeted ad insertion process and the particular implementation shown in FIG. 4 are merely examples, and numerous alternative arrangements may be used in implementing interface device based ad insertion using the techniques of the invention.

As indicated previously, an ad insertion software agent, intelligent application or other type of software program may be downloaded to or otherwise stored in the STB to provide support of the above-described ad insertion functionality.

The particular embodiments shown in FIGS. 2 through 4 are in the context of an IPTV system. However, as noted previously, the disclosed techniques can be adapted in a straightforward manner for use in other types of signal distribution systems, such as cable and satellite television systems.

Any advertisements that are updated in the manner described above may have expiration information associated therewith. Such information may be used, for example, to indicate to the STB when a further update is needed.

The above-described embodiments of the invention are intended to be illustrative only. For example, as indicated above, the techniques can be applied to a wide variety of media delivery services, including audio services delivered via digital satellite radio, and to other arrangements for delivering signals associated with subscription or non-subscription media services. Further, the media streams that are delivered to an interface device associated with a given user may include any type of data, including, for example, audio, video, speech or other information signals, in any combination.

These and numerous other alternative embodiments within the scope of the following claims will be readily apparent to those skilled in the art.

We claim:

1. A method of delivering targeted information to user interface devices in a signal distribution system, the method comprising the steps of:
   sending at least one multicast update comprising updated targeted information to the user interface devices during a multicast update period; and
   if a given one of the user interface devices is unable to obtain a complete set of the updated targeted information from the multicast update before timeout of the multicast update period, sending a unicast update, comprising at least a portion of the updated targeted information, to the given user interface device during a unicast update period;
      wherein a first multicast update period is used for a first group of the user interface devices and a second multicast update period different than the first multicast update period is used for a second group of the user interface devices.

2. The method of claim 1 further comprising the step of receiving a request from the given user interface device for a designated portion of the updated targeted information that was previously sent in said at least one multicast update, wherein the unicast update comprises the requested designated portion of the updated target information and is sent responsive to the request.

3. The method of claim 1 wherein the targeted information comprises a plurality of advertisements targeted to the user interface devices.

4. The method of claim 1 wherein the user interface devices are configured to download the updated targeted information from the multicast update only when said devices are in a specified mode of operation.

5. The method of claim 4 wherein the user interface devices are configured to download the updated targeted information from the multicast update only when said devices are in respective non-viewing modes of operation.

6. The method of claim 5 wherein the portion of the updated targeted information sent to the given user interface device in the unicast update comprises that portion of the updated targeted information that the given user interface device is unable to download from the multicast update when in its non-viewing mode of operation.

7. The method of claim 1 wherein the step of sending at least one multicast update comprising updated targeted information to the user interface devices during a multicast update period further comprises sending said multicast update in a plurality of rounds with each round including the same set of updated targeted information.

8. The method of claim 7 wherein each of the rounds comprises a particular sequence of updated targeted advertisements.

9. The method of claim 8 wherein the portion of the updated targeted information sent to the given user interface device in the unicast update comprises particular ones of the updated targeted advertisements that the given user interface device is unable to download from said at least one multicast update.

10. The method of claim 1 wherein the multicast update is sent during designated periods of time and the unicast update is sent outside of said designated periods of time.

11. The method of claim 1 wherein the user interface devices are arranged in the first and second groups based on demographic information.

12. A non-transitory computer-readable storage medium having executable program code embodied therein wherein the program code when executed in a processing device causes the processing device to perform the steps of the method of claim 1.

13. An apparatus for updating targeted information stored by user interface devices in a signal distribution system, the apparatus comprising:
   a processing device comprising a processor coupled to a memory;
   wherein the processing device is operative to send at least one multicast update comprising updated targeted information to the user interface devices during a multicast update period, and if a given one of the user interface devices is unable to obtain a complete set of the updated targeted information from the multicast update before timeout of the multicast update period, to send a unicast update, comprising at least a portion of the updated targeted information, to the given user interface device during a unicast update period;
      wherein a first multicast update period is used for a first croup of the user interface devices and a second multicast update period different than the first multicast update period is used for a second croup of the user interface devices.

14. The apparatus of claim 13 wherein the processing device comprises an advertising server coupled to the user interface devices via a network element comprising at least one of a router and a switch.

15. A method of updating targeted information stored by a user interface device in a signal distribution system, the method comprising the steps of:
   receiving periodic multicast updates of the targeted information in the user interface device;
   generating a request for a designated portion of updated targeted information that was previously sent in one or more of the periodic multicast updates; and
   receiving a unicast update, comprising the designated portion of the updated targeted information, in the user interface device responsive to the request;
   wherein said user interface device is associated with a first group of user interface devices and further wherein the user interface device is configured to receive the periodic multicast updates in a first multicast update period, the first multicast update period being different than a second multicast update period used for a second group of user interface devices.

16. The method of claim 15 wherein the user interface device is configured to download updated targeted information from the periodic multicast updates only when said device is in a non-viewing mode of operation.

17. The method of claim 16 wherein the designated portion of the updated targeted information requested by the user interface device comprises that portion of the updated targeted information that the user interface device is unable to download from the periodic multicast updates when in the non-viewing mode of operation.

18. A non-transitory computer-readable storage medium having executable program code embodied therein wherein the program code when executed in a processing device causes the processing device to perform the steps of the method of claim 15.

19. An interface device for use in a signal distribution system, the interface device comprising:
- a memory;
- a processor coupled to the memory; and
- interface circuitry configured to receive targeted information from a network element of the signal distribution system;
- wherein the interface device is configured to receive periodic multicast updates of the targeted information, to generate a request for a designated portion of updated targeted information that was previously sent in one or more of the periodic multicast updates, and to receive a unicast update comprising the designated portion of the updated targeted information responsive to the request; and
- wherein the interface device is associated with a first group of interface devices and further wherein said interface device is configured to receive the periodic multicast updates in a first multicast update period, the first multicast update period being different than a second multicast update period used for a second group of user interface devices.

20. The interface device of claim 19 wherein said interface device comprises a set-top box of the signal distribution system.

* * * * *

UNITED STATES PATENT AND TRADEMARK OFFICE
CERTIFICATE OF CORRECTION

PATENT NO.        : 8,910,197 B2  
APPLICATION NO.   : 12/197505  
DATED             : December 9, 2014  
INVENTOR(S)       : S. Acharya et al.

It is certified that error appears in the above-identified patent and that said Letters Patent is hereby corrected as shown below:

In the claims:

Claim 13, column 12, line 29, please change "croup" to --group--

Claim 13, column 12, line 32, please change "croup" to --group--

Claim 19, column 13, line 24, after "group of" please delete "user"

Signed and Sealed this  
Seventeenth Day of March, 2015

Michelle K. Lee  
*Director of the United States Patent and Trademark Office*